United States Patent Office 2,744,026
Patented May 1, 1956

2,744,026

CELLULOSE ACETATE-BUTYRATE PLASTICIZED WITH A DI-ALKYL SUBERATE

Charles P. Albus, Easton, Pa., and Donald E. Sargent, Schenectady, N. Y., assignors to General Aniline & Film Corporation, New York, N. Y., a corporation of Delaware No Drawing. Application November 16, 1951, Serial No. 256,817

3 Claims. (Cl. 106—181)

The object of this invention is a composition of matter comprising cellulose acetate-butyrate plasticized with di-n-hexyl or di-n-octyl suberate.

Cellulose ethers and esters as such form hard, brittle cast films and molded articles. Molding powders are produced by blending plasticizers with cellulose ester powders at slightly elevated temperatures. The resulting powder then flows more freely due to the plasticizer to form combs, handles for kitchen utensils, boxes, toys, etc. when subjected to heat and pressure in a mold. Films cast from solvent solutions are more flexible, and as a result, more durable due to the addition of plasticizer. The most important properties a plasticizer should possess appear to be compatibility with the cellulose ether and ester, low volatility, and water resistance. If a plasticizer is not completely compatible in the proportions generally used with a cellulose ether or ester, the plasticizer will exude from the film or molded piece giving generally an opaque appearance and oily feel. Sometimes this occurs only after the article or film is allowed to stand. In either case, the cellulose ester reverts to its original hardness and brittleness. The same thing holds true of low boiling plasticizers. If they boil off slowly on standing or at temperatures to which the cellulose ester is subjected either in preparation or use, the cast film or molded article again becomes brittle and may easily crack or break. Films, lacquers, and molded articles may be subjected to water in their use. If the plasticizer is water soluble to even a small extent, the plasticizer is leached out of the cellulose ester which then becomes hard and brittle. Other properties which may be desired of a plasticizer will depend on the end use of the cellulose ester or ether. Some plasticizers will impart resistance to flammability, oils, greases, and weathering.

For example, triphenyl phosphate is commonly used where fire resistance is desired. Some plasticizers discolor badly or oxidize to give off objectionable odors.

No one plasticizer seems to be a cure-all for defects in use. This is probably the reason why several hundred plasticizers have been suggested. However, the majority generally fail in one or more of the desired and necessary properties, such as compatibility, low volatility, and water resistance.

The following are typical examples of commercial plasticizers used for plasticizing cellulose esters and ethers:

Triacetin (glyceryl triacetate)
Dibutyl tartrate
Bis-methoxyethyl adipate
Methoxyethyl oleate
Triphenyl phosphate
Tricresyl phosphate
Methyl phthalyl ethyl glycolate
Dimethyl phthalate
Bis-methoxyethyl phthalate
Bis-butoxyethyl phthalate
Butoxyethyl stearate
Fish oil
Cottonseed oil
Linseed oil
Soybean oil The foregoing esters have not been accepted with complete satisfaction, however, because of their various defects. Triacetin and dibutyl tartrate have poor water resistance. Bis-methoxyethyl adipate is both water sensitive and rather volatile. Methoxyethyl oleate and butoxyethyl stearate are fatty acid derivatives and films plasticized with these materials are liable to a mildew type of fungi attack. Triphenyl phosphate has poor light stability and is likely to cause discoloration of cellulose acetate and nitrocellulose. Tricresyl phosphate has poor light stability and also has the added defect of being rather toxic, especially if a large portion of the ortho isomer which is believed to be the toxic element is present. Methyl phthalyl ethyl glycolate appears to be rather volatile and water sensitive. It is also incompatible with cellulose acetate of 52% combined acetic acid content. Dimethyl phthalate is rather volatile, and has a tendency at low temperatures to crystallize from films and other articles not only causing embrittlement but also a possibly partially permanent loss of transparency and whitening of the films and finished goods. Bis-methoxyethyl and bis-butoxyethyl phthalate appear to be fairly volatile when used as plasticizers for cellulose esters. Fish and cottonseed oils possess objectionable odors and are likely to become rancid on aging. Vegetable oils, such as linseed and soybean oil, have limited compatibility in ethyl cellulose and readily exude when more than about 30 to 40% is incorporated as a plasticizer.

It has been found that the foregoing objections can be readily overcome by plasticizing a cellulose ether or ester composition with esters of monohydroxy alcohols of 6 to 14 carbon atoms with suberic acid. Esters of this type when employed as plasticizers display outstanding properties in that they impart to the cellulose ether or ester composition greater elasticity and higher tensile strength. They are unaffected by ultraviolet light and are stable to heat so that their volatility in the cellulose ether or ester composition is substantially negligible. In particular, they are compatible with any one of the commonly employed cellulose ethers and esters so that no air or water exudation of the plasticizer occurs. In addition to their compatibility, low volatility, and water resistance, they are odorless and do not impart any color to the plasticized cellulose ether or ester composition. The plasticizers hereinafter referred to as esters of suberic acid with monohydric alcohols are obtained by the usual esterification procedure in the presence of sulfuric acid as a catalyst. Esterification may be performed in two steps: (1) heating at reflux to partial completion, followed by (2) gradually removing by distillation the water produced to complete the esterification. The temperature of reflux is determined by the nature and relative amounts of reactants present, usually in the range of 100–120° C. and an average time of reflux is two to three hours, although this may vary with the reactivity of the reactants. The water produced is removed by distillation during an additional 1 to 5 hours, the pot temperature gradually rising as water is removed to a maximum determined by the boiling point of the alcohol used and of the ester produced. The volume of water removed is an indication of the extent of reaction. The desirability of conducting the esterification in these two steps is indicated by the fact that codistillation of alcohol with water occurs to some extent even with this method. Removal of the water by distillation is necessary to insure complete esterification.

Sulfuric acid is a satisfactory catalyst for these esterifications, although others, such as p-toluenesulfonic acid, or other acidic esterification catalysts, may be used with equal success. The esters are distilled in vacuo, and are obtained as distinct compounds.

The suberic acid is commercially available and is derived from cyclooctatetraene by reduction to cyclooctene, followed by oxidation, or from 1,6-hexanediol by conversion to 1,6-dichlorohexane which is reacted with sodium cyanide to yield suberonitrile, followed by hydrolysis to suberic acid.

As examples of suitable monohydroxy alcohols of 6 to 14 carbon atoms, the following may be mentioned:

1-hexanol
2-ethyl-1-hexanol
1-octanol
1-nonanol
1-decanol
1-hendecanol
1-dodecanol
1-tridecanol
1-tetradecanol.

In addition to the foregoing monohydric alcohols, monohydric alcohols containing an ether linkage may also be employed and include such ether alcohols as:

Ethylene glycol monobutyl ether—$C_4H_9OCH_2CH_2OH$
Ethylene glycol ethylbutyl ether—
$(C_2H_5)_2CHCH_2OCH_2CH_2OH$
Diethylene glycol monobutyl ether—
$C_4H_9OCH_2CH_2OCH_2CH_2OH$
Diethylene glycol monoethyl ether—
$C_2H_5OCH_2CH_2OCH_2CH_2OH$
Triethylene glycol monomethyl ether—
$CH_3OCH_2CH_2OCH_2CH_2OCH_2CH_2OH$ The following examples will serve to illustrate the process utilized in the preparation of the ester plasticizers. All parts given are by weight unless otherwise specified.

EXAMPLE I 87 parts of suberic acid, 260 parts of 2-ethylhexanol, and 5 parts of 50% sulfuric acid were charged into a 500 ml., 3-necked flask equipped with a sealed stirrer, thermometer, and reflux condenser. The reaction mixture was heated with stirring under reflux at a temperature of 108° C. for 3 hours and resulted in a brown homogeneous solution. After cooling somewhat, 10 parts of Nuchar decolorizing charcoal were added and the reflux condenser replaced by a short Vigreaux distilling head and take-off condenser. The heating and stirring were continued for an additional 2 hours and the temperature permitted to rise to a maximum of 131° C. During this interval the theoretical volume of water was removed together with some 2-ethylhexanol which co-distilled. After cooling and removing the Nuchar by filtration, the filtrate was obtained as a clear, yellow solution. This solution was diluted with 150 parts of diethyl ether and washed with two 100-part portions of 10% aqueous sodium carbonate solution followed by two 100-part portions of water. The organic layer which was concentrated by removal of the ether solvent was distilled in vacuo. The di-2-ethylhexyl suberate was obtained as a light yellow, somewhat viscous liquid in a yield of 68.5% based on the suberic acid charged. The ester had the following physical properties:

Boiling point _____ 167° C./0.3 mm.
Refractive index _____ $n_D^{25}$ 1.4472

EXAMPLE II 87 parts of suberic acid, 260 parts of n-octanol, 5 parts of 50% sulfuric acid, and 10 parts of Nuchar decolorizing charcoal were charged into a 500 ml., 3-necked flask equipped as in Example I. The reaction mixture was heated with stirring under reflux at a temperature of 106–108° C. for 2.5 hours, the reflux condenser being replaced by a Vigreaux distilling head and take-off condenser. The water was removed by distillation during an additional 2.5 hours, and the pot temperature was permitted to rise to a maximum of 133° C. After cooling and removing the Nuchar by filtration, the filtrate was obtained as a light yellow solution. This solution was diluted with 150 parts of diethyl ether and washed with three 100-part portions of aqueous sodium carbonate solution followed by two 100-part portions of water. The organic layer which was concentrated by removal of the ether was distilled in vacuo. The di-n-octyl suberate was obtained as a light yellow liquid in a yield of 79.5%, based on the suberic acid charged. The ester had the following physical properties:

Boiling point _____ 184° C./0.4 mm.
Refractive index _____ $n_D^{25}$ 1.4463

EXAMPLE III 87 parts of suberic acid, 204 parts of n-hexanol, and 5 parts of 50% sulfuric acid were charged into a 500 ml., 3-necked flask equipped as in Example I. The reaction mixture was heated with stirring under reflux at a temperature of 104–106° C. for 2 hours. After cooling somewhat, 10 parts of Nuchar decolorizing charcoal were added and the reflux condenser replaced by a short Vigreaux distilling head and take-off condenser. Water was removed by distillation during an additional 2 hours. The reaction mixture was worked up as in Example I. Di-n-hexyl suberate was obtained as a light yellow liquid in a yield of 46%, based on the suberic acid charged. The ester had the following physical properties:

Boiling point _____ 147° C./0.2 mm.
Refractive index _____ $n_D^{25}$ 1.4425

In a similar manner, esters of 1-tridecanol with suberic acid, 1-tetradecyl with suberic acid, and ethylene glycol ethybutyl ether with suberic acid were prepared as described in the foregoing working examples.

The esters prepared as above are compatible with all of the cellulose ethers and esters commercially used, such as cellulose acetate, cellulose triacetate, cellulose acetate propionate, cellulose acetate butyrate, cellulose nitrate, cellulose nitrate acetate, ethyl cellulose, benzyl cellulose, and the like. The esters may be incorporated into molding powders of cellulose ethers and esters or into solutions which are normally prepared for films, lacquers, dopes, and laminating solutions. The concentration or amount to be used as a plasticizer will depend, of course, on the type of cellulose ether or ester composition. The approximate amounts to be employed for any particular composition can be very readily determined by simple routine spot experiments. In general, however, the amount for molding powders may range from 20 to 40% of the powder, in solutions for films anywhere from 10 to 50%, in lacquers about 10 to 60%, in dopes from 40 to 100%, and in laminating solutions from 20 to 50%. All of these percentages are based on the weight of the cellulose ether or ester.

The following examples illustrate the application of the foregoing esters as plasticizers and the improved results obtained thereby when compared with currently used plasticizers.

EXAMPLE IV

A film of cellulose acetate of 5 mil thickness, containing 58.4 to 59% combined acetic acid, was prepared by casting the composition given below containing various commonly used commercial plasticizers on a clean, glass plate with a doctor blade, followed by air drying for 48 hours at room temperature at a controlled rate to prevent blushing of or other physical damage to the film.

The film was then removed from the glass plate and further dried for 2 hours at 60° C. in the presence of freely circulating air.

| | Parts |
|---|---|
| Cellulose acetate | 15 |
| Plasticizer | 3 |
| Methylene chloride | 50 |
| Ethylene chloride | 22 |
| Absolute ethanol | 10 |

In like manner, films of the same thickness were prepared in which the plasticizer prepared as described above were substituted for the various commercial plasticizers in the above composition. These films have excellent flexibility and clarity.

Samples of all of the films were placed in an air circulating oven for 24 hours at 100° C., following which the per cent weight loss of the films was determined. The superiority of films containing the plasticizers of this invention over similar films containing various commonly used commercial plasticizers in resistance to loss of weight under this treatment is shown in Table 1.

Table 1

| Plasticizer | Percent Weight Loss of Film After 24 Hours at 100° C. |
|---|---|
| Dimethyl phthlate | 5.0 |
| Methyl phthalyl ethyl glycolate | 5.5 |
| Triacetin | 6.1 |
| Dibutyl tartrate | 7.0 |
| Methoxyethyl oleate | 6.6 |
| Butoxyethyl stearate [1] | 8.6 |
| Bis-methoxyethyl adipate | 9.4 |
| Bis-butoxethyl phthalate | 4.9 |
| Di-2-ethyl-1-hexyl suberate | 4.2 |
| Di-1-octyl suberate | 4.0 |
| Di-1-hexyl suberate | 4.1 |

[1] Plasticizer not completely compatible.

EXAMPLE V

A film of cellulose acetate butyrate of 5 mil thickness having an average acetyl content of 30% and butyryl content of 17.5% was prepared by casting the composition given below containing various commonly used commercial plasticizers on a clean, glass plate with a doctor blade, followed by air drying for 48 hours at room temperature at a controlled rate to prevent blushing of the film. The film was then removed from the glass plate and further dried for 2 hours at 60° C. in the presence of freely circulating air.

| | Parts |
|---|---|
| Cellulose acetate butyrate | 15 |
| Plasticizer | 3 |
| Methylene chloride | 50 |
| Ethylene chloride | 22 |
| Absolute ethanol | 10 |

In like manner, films of the same thickness were prepared in which the plasticizers prepared as described above were substituted for the various commercial plasticizers in the given composition. Films of excellent flexibility and clarity were produced.

Samples of all of these films were exposed to freely circulating air in an oven for 24 hours at 100° C. and to the leaching action of water for 48 hours at room temperature. The superiority of films containing the plasticizers of this invention over those containing various commercial plasticizers in resistance to weight loss under these conditions is shown in Table 2.

Table 2

| Plasticizer | Percent Weight Loss of Film After 24 Hours at 100° C. | Percent Weight Loss of Film After 48 Hours in Water at Room Temperature |
|---|---|---|
| Dimethyl phthalate | 7.9 | 2.7. |
| Methyl phthalyl ethyl glycolate | 7.2 | 1.8. |
| Triacetin | 9.7 | 3.6. |
| Dibutyl tartrate | 9.8 | 3.8. |
| Methoxyethyl oleate | 9.9 | 0.4. |
| Butoxyethyl stearate [1] | 8.1 | 0.5. |
| Bis-methoxyethyl adipate | 14.5 | 14.4. |
| Bis-methoxyethyl phthalate | 7.1 | 2.1. |
| Bis-butoxyethyl phthalate | 7.5 | 0.8. |
| Di-2-ethyl-hexyl suberate | 6.4 | 0.5. |
| Di-1-octyl suberate | 3.6 | Less than 0.1. |
| Di-1-hexyl suberate | 3.5 | Less than 0.1. |

[1] Plasticizer not completely compatible.

We claim:

1. A composition of matter comprising cellulose acetate butyrate containing, in a plasticizing amount, an ester selected from the group consisting of di-n-hexyl suberate and di-n-octyl suberate.

2. A composition of matter comprising cellulose acetate butyrate containing, in a plasticizing amount, di-n-hexyl suberate.

3. A composition of matter comprising cellulose acetate butyrate containing, in a plasticizing amount, di-n-octyl suberate.

References Cited in the file of this patent

UNITED STATES PATENTS

| 1,989,701 | Lawson | Feb. 5, 1935 |
| 2,015,088 | Reid | Sept. 24, 1935 |
| 2,129,156 | Trolander | Sept. 6, 1938 |
| 2,337,340 | Meyer | Dec. 21, 1943 |
| 2,510,177 | Horback | June 6, 1950 |